United States Patent
Guthrie et al.

(10) Patent No.: US 9,069,701 B2
(45) Date of Patent: *Jun. 30, 2015

(54) VIRTUAL MACHINE FAILOVER

(71) Applicant: International Business Machines Corporation, Armonk, NY (US)

(72) Inventors: Guy Lynn Guthrie, Austin, TX (US); Naresh Nayar, Rochester, MN (US); Geraint North, Manchester (GB); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/710,927

(22) Filed: Dec. 11, 2012

(65) Prior Publication Data

US 2014/0164709 A1 Jun. 12, 2014

(51) Int. Cl.
*G06F 12/12* (2006.01)
*G06F 12/08* (2006.01)
*G06F 11/14* (2006.01)

(52) U.S. Cl.
CPC ............ *G06F 12/12* (2013.01); *G06F 12/0806* (2013.01); *G06F 12/0804* (2013.01); *G06F 11/14* (2013.01); *G06F 2212/151* (2013.01)

(58) Field of Classification Search
None
See application file for complete search history.

(56) References Cited

U.S. PATENT DOCUMENTS

| 4,646,237 | A | * | 2/1987 | Allen ............................ 710/107 |
| 5,235,700 | A | | 8/1993 | Alaiwan et al. |
| 5,299,144 | A | * | 3/1994 | Bartkowiak et al. .......... 708/200 |
| 5,644,742 | A | | 7/1997 | Shen et al. |
| 5,650,993 | A | * | 7/1997 | Lakshman et al. ............ 370/236 |
| 5,721,830 | A | * | 2/1998 | Yeh et al. ...................... 709/237 |
| 5,745,672 | A | | 4/1998 | Stiffler |

(Continued)

FOREIGN PATENT DOCUMENTS

GB 2463409 B 11/2011

OTHER PUBLICATIONS

Schulz, Martin et al. "Implementation and Evaluation of a Scalable Application-level Checkpoint-Recovery Scheme for MPI Programs"; Dept. of Computer Science, Cornell Univ. Ithaca, NY 2004 (14 pg).

*Primary Examiner* — Daniel Bernard
(74) *Attorney, Agent, or Firm* — Russell Ng PLLC; Matthew Baca

(57) ABSTRACT

Disclosed is a computer system (100) comprising a processor unit (110) adapted to run a virtual machine in a first operating mode; a cache (120) accessible to the processor unit, said cache including a cache controller (122); and a memory (140) accessible to the cache controller for storing an image of said virtual machine; wherein the processor unit is adapted to create a log (200) in the memory prior to running the virtual machine in said first operating mode; the cache controller is adapted to transfer a modified cache line from the cache to the memory; and write only the memory address of the transferred modified cache line in the log; and the processor unit is further adapted to update a further image of the virtual machine in a different memory location, e.g. on another computer system, by retrieving the memory addresses stored in the log, retrieve the modified cache lines from the memory addresses and update the further image with said modifications. A computer cluster including such computer systems, a method of managing such a computer cluster and a computer program product are also disclosed.

9 Claims, 6 Drawing Sheets

(56) References Cited

U.S. PATENT DOCUMENTS

| | | | |
|---|---|---|---|
| 5,893,155 A | 4/1999 | Cheriton | |
| 5,920,572 A * | 7/1999 | Washington et al. | 370/535 |
| 5,925,123 A * | 7/1999 | Tremblay et al. | 712/212 |
| 6,073,228 A * | 6/2000 | Holmqvist et al. | 711/217 |
| 7,596,677 B1 * | 9/2009 | Koryakin et al. | 711/206 |
| 8,127,174 B1 | 2/2012 | Shah et al. | |
| 8,429,307 B1 * | 4/2013 | Faibish et al. | 710/5 |
| 2003/0200351 A1 * | 10/2003 | O'Connor et al. | 709/315 |
| 2005/0120191 A1 | 6/2005 | Akkary et al. | |
| 2006/0184937 A1 * | 8/2006 | Abels et al. | 718/1 |
| 2010/0042672 A1 * | 2/2010 | Lo et al. | 709/203 |
| 2010/0228819 A1 * | 9/2010 | Wei | 709/203 |
| 2011/0219208 A1 * | 9/2011 | Asaad et al. | 712/12 |
| 2011/0234200 A1 * | 9/2011 | Shenoi | 324/76.38 |
| 2012/0017204 A1 * | 1/2012 | Hrischuk et al. | 717/151 |
| 2012/0117562 A1 * | 5/2012 | Jess et al. | 718/1 |
| 2014/0143504 A1 * | 5/2014 | Beveridge | 711/143 |
| 2014/0164700 A1 * | 6/2014 | Liang | 711/119 |

* cited by examiner

VIRTUAL MACHINE FAILOVER

FIELD OF THE INVENTION

The present invention relates to a computer system comprising a processor unit adapted to run a virtual machine in a first operating mode, a cache accessible to the processor unit, said cache including a cache controller: and a memory accessible to the cache controller for storing an image of said virtual machine.

The present invention further relates to a computer cluster comprising a plurality of such computer systems.

The present invention yet further relates to a computer program product and a method of operating a computer cluster comprising a first system and a second system each including a memory comprising an image of a virtual machine, at least one processor unit, and a cache accessible to the at least one processor unit.

BACKGROUND

Virtualization is commonly applied on computer clusters to improve the robustness of the implemented computing architecture to faults and to increase utilization of the resources of the architecture. In a virtualized architecture, the processor units, e.g. processors and/or processor cores, of the computer systems in the cluster act as the physical hosts of virtual machines (VMs), which are seen by the outside world as independent entities. This facilitates robustness of the architecture to hardware failures, as upon a hardware failure a VM previously hosted by the failed hardware may be fail over to another host in some manner without the user becoming aware of the hardware failure. This concept is an important facilitator of so-called 'high availability' of a service provided by such a VM.

Implementing such a failover is not a trivial task, as the VM ideally should be relaunched in a state that is identical to the state of the VM at the point of the hardware failure to avoid inconvenience to the user.

In one approach, failover is provided by running multiple copies of a single VM in lock-step on different entities, e.g. different physical servers, such that upon the failure of one entity another entity can take over the responsibility for hosting the VM. A significant drawback of such lock-step arrangements is that processing resources are consumed by a failover copy of a VM, thus reducing the available bandwidth of the system, i.e. reducing the total number of VMs that can be hosted by a system.

In another approach commonly found in commercial products, a physical host responds to a failure of another physical host by simply rebooting the VM from a shared disk state, e.g. a shared image of the VM. This however increases the risk of disk corruption and the loss of the exposed state of the VM altogether.

A different failover approach is disclosed in "Remus: High Availability via Virtual Machine Replication" by Brendan Cully et al. in NSDI'08 Proceedings of the $5^{th}$ USENIX Symposium on Networked Systems Design and Implementation, 2008, pages 161-174. In this approach, all VM memory is periodically marked as read only to allow for changes to the VM memory to be replicated in a copy of the VM memory on another host. In this read-only state, a hypervisor is able to trap all writes that a VM makes to memory and maintain a map of pages that have been dirtied since the previous round. Each round, the migration process atomically reads and resets this map, and the iterative migration process involves chasing dirty pages until progress can no longer be made. This approach improves failover robustness because a separate up to date image of the VM memory is periodically created on a backup host that can simply launch a replica of the VM using this image following a hardware failure of the primary host.

However, a drawback of this approach is that as the VM remains operational during the read-only state of its VM memory, a large number of page faults can be generated. In addition, this approach does not allow for the easy detection of what portion of a page has been altered, such that whole pages must be replicated even if only a single bit has been changed on the page, which is detrimental to the overall performance of the overall architecture, as for instance small page sizes have to be used to avoid excessive data traffic between systems, which reduces the performance of the operating system as the operating system is unable to use large size pages.

U.S. Pat. No. 5,893,155 discloses a digital computer memory cache organization implementing efficient selective cache write-back, mapping and transferring of data for the purpose of roll-back and roll-forward of e.g. databases. Write or store operations to cache lines tagged as logged are written through to a log block builder associated with the cache. Non-logged store operations are handled local to the cache, as in a writeback cache. The log block builder combines write operations into data blocks and transfers the data blocks to a log splitter. A log splitter demultiplexes the logged data into separate streams based on address.

In short, the above approaches are not without problems. For instance, during suspension of the VM, the cache is sensitive to page faults as the cache is put into a read-only state, as previously explained. Furthermore, large amounts of data may have to be stored for each checkpoint, which causes pressure on the resource utilization of the computing architecture, in particular the data storage facilities of the architecture.

BRIEF SUMMARY OF THE INVENTION

The present invention seeks to provide a computer system according to the opening paragraph in which VM replication can be achieved in a more efficient manner.

The present invention further seeks to provide a computer cluster including a plurality of such systems.

The present invention yet further seeks to provide a method of managing such a computer cluster in which VMs can be replicated in a more efficient manner.

In accordance with a first aspect of the present invention, there is provided a computer system comprising a processor unit adapted to run a virtual machine in a first operating mode; a cache accessible to the processor unit, said cache including a cache controller; and a memory accessible to the cache controller for storing an image of said virtual machine; wherein the processor unit is adapted to provide a replication manager adapted to define a log in the memory prior to running the virtual machine in said first operating mode; the cache controller is adapted to transfer a modified cache line from the cache to the memory or another cache in the computer system; and write only the memory address of the transferred modified cache line in the defined log; and the processor unit is adapted to update a further image of the virtual machine in a different memory location by retrieving the memory addresses from the defined log, retrieving the modified cache lines from the memory addresses image; and updating the further image with said retrieved modified cache lines In the computer system of the present invention, a processor unit is adapted to host a VM (in the first operating mode) as well as act as an VM image replication manager to create a replica of a VM image in another location, e.g. in the memory of another computer system. The present invention is based on the insight that as all changes made to an image of an active VM by the processor unit hosting the VM will travel through its cache, it is possible to simply log the memory address associated with a dirty cache line upon the dirty cache line being transferred to the image of the VM in memory or to another cache associated with another processor unit. These logged addresses may then be used by the same processor unit or by another processor unit with access to the same system memory, to transfer only the altered data of the primary image to the image copy, e.g. on another system, to synchronize this copy with the primary VM image.

This removes the need to incur additional page faults and reduces the traffic between systems due to the smaller granularity of the data modification, i.e. cache line-size rather than page size and due to the fact that the VM is suspended during image replication, thus obviating the need for page protection. This approach is furthermore page size-agnostic such that larger page sizes can be used than for instance is the case in the Remus approach. Moreover, the additional hardware cost to the computer system is minimal; only minor changes to the cache controller, e.g. to the cast-out engine of the cache controller, are required to ensure that in addition to casting out a dirty cache line, the cache controller also writes the memory address of the dirty cache line in the log.

The present invention may replicate data from the primary VM image to a copy in push or pull fashion. In a push implementation, a processor unit of the computer system including the processor unit running the VM is responsible for updating the copy of the image of the VM in the different memory location, i.e. pushes the modified cache lines to this location, which may be a memory location in the memory of the same computer system or a memory location in the memory of a different computer system. The processor unit responsible for this updating task may be the same processor that runs the VM or may be a different processor of the same computer system. In a pull implementation, a processor unit of a different computer system pulls the modified cache lines from the computer system hosting the VM to update the copy of the VM image on the different computer system.

In an embodiment, a processor unit is adapted to update the copy of the VM image in a second operating mode. This has the advantage that such a processor unit can be switched between a mode in which it is adapted to run a VM and a mode in which it is adapted to replicate modified cache lines from a primary version of the VM image to its copy in a different memory location, which enhances the flexibility of the computer system. The replication manager may be adapted to switch its processor unit between the first operating mode and the second operating mode. In order to identify a processor unit as running in a first operating mode or a second operating mode, the processor unit may include a bit flag under control of the replication manager, which bit flag may be toggled upon switching between the two operating modes.

In a preferred embodiment, the replication manager forms part of a hypervisor of the processor unit. The replication manager preferably is realized in software, in which case the processor unit will have access to executable program code defining the replication manager, although hardware implementations or hardware/software co-design implementations of the replication manager are also feasible.

Preferably, the cache controller is further adapted to write the memory address of the transferred modified cache line to a further cache line and to periodically write a plurality of memory addresses of the transferred modified cache lines from the further cache line to the log. The implementation of such an intermediate buffer allows for the update of the log to be performed asynchronously and less frequently than would be the case in its absence, thus further improving system performance due to the reduced frequency of relatively slow data traffic from the cache to the memory of the computer system.

The replication manager may be further adapted to trigger the failover of the virtual machine to a further processing element in case the log becomes full during the first operation mode of the processor unit. This ensures that future changes to the state of the VM will not be lost, as future dirtying of the VM cache can be logged in the log associated with the further processing element, e.g. a processing element of another computer system, whilst in the meantime the full log can be cleared.

In an embodiment, the log is a circular buffer and the system comprises a plurality of register adapted to store a first pointer in a wrap-around address of the circular buffer; a second pointer to the next available address of the circular buffer; a third pointer to an initial address of the circular buffer; and the size of the buffer; and the cache controller is adapted to update at least the second pointer following the writing of a memory address in the log.

Preferably, each processor unit is configured to deduplicate the memory addresses in the log prior to the retrieval of the addresses from the log. This reduces the amount of time required for synchronizing data between the memories respectively comprising the image of the VM and its copy because it is ensured that the altered data in a logged memory location is copied once only, thus further reducing the amount of time the primary VM is suspended.

In accordance with another aspect of the present invention, there is provided a computer cluster comprising a plurality of computer systems according to an embodiment of the present invention and a network interconnecting the plurality of computer systems. Such a cluster offers a better user experience as improved failover between VMs hosted by the computer systems is achieved for the reasons given above.

In accordance with yet another aspect of the present invention, there is provided a method of operating a computer cluster comprising a first computer system including a memory comprising an image of a virtual machine, at least one processor unit, and a cache accessible to the at least one processor unit, wherein each processor unit is adapted to run the virtual machine in first operation mode; wherein in said first operation mode, a processor unit of the first computer system performs the steps of defining a log in the memory of the first computer system; running the virtual machine; and upon transferring modified data from a cache line to the memory of the first computer system or another cache in the first computer system, writing only said memory address in the log; and wherein a processor unit updates a further image of the virtual machine in a different memory location by performing the steps of reading the memory addresses from the log in the memory of the first computer system; retrieving the cache lines stored at said memory addresses; and updating the further image with the retrieved cache lines.

The method of the present invention ensures that different images of a VM are periodically synchronized without the occurrence of page faults and requiring minimal data transfer, as already explained in more detail above.

The processor unit operating in the first operation mode and the processor unit updating the further image of the virtual machine may reside on the same computer system, in which case the processor unit updating the further image pushes the altered cache line from the primary VM image to the further image. The processor unit operating in the first operation mode and the processor unit updating the further image of the virtual machine may be different processor units or may be the same processor unit. Alternatively, the processor unit operating in the first operation mode and the processor unit updating the further image of the virtual machine reside on different computer systems, in which case the processor unit updating the further VM image pulls the modified cache line from the primary image of the VM on another computer system.

In case the processor unit operating in the first operation mode and the processor unit updating the further image of the virtual machine are different processor units, the processor unit updating the further image of the virtual machine may update the further image in a second operation mode. This has the advantage that processor units can perform both the task of running a VM and replicating VM images, thus improving the flexibility of the computer cluster. A further advantage is that the running of the VM and the updating of the further VM image can be performed at least partially concurrently, which reduces the duration of the time period required for the suspension of the VM, thus improving the overall performance of the computer cluster.

In an embodiment, the computer cluster further comprises a second computer system including a memory comprising the further image, at least one further processor unit, and a further cache accessible to the at least one further processor unit, wherein each further processor unit is adapted to run the virtual machine in a first operation mode using said further image.

Preferably, in said first operation mode, the processor unit of the first computer system further performs the step of periodically suspending the virtual machine; and wherein said transferring step includes flushing modified data from the cache during the suspension of the virtual machine to ensure that all dirty data is logged in the log.

In an embodiment, at least a cache of the first computer system comprises an intermediate buffer, and wherein said transferring step comprises storing the memory address in the intermediate buffer; and periodically transferring the memory addresses from the intermediate buffer to the log. This reduces the write frequency to the log, which improves the performance of the VM during its execution. Preferably, said periodically transferring step is performed when the intermediate buffer is full to minimize this frequency. Preferably, the intermediate buffer has a size that is a multiple of the size of a memory address for optimal transfer efficiency.

The method may further comprise the step of deduplicating the memory addresses in at least one log associated with the image prior to the step of reading the memory addresses from the log, such that multiple accesses of the same data are avoided and a further smoothening of the data transfer between computer systems is achieved.

The deduplication concept may be advantageously extended to cover an embodiment in which the first computer system comprises a plurality of processor units hosting the virtual machine, each processor unit of said plurality having access to a separate cache associated with a respective log in the memory of the first computer system, wherein said deduplication step comprises deduplicating addresses across the respective logs.

To aid management of the log, each computer system may further comprise a plurality of registers for managing said log, wherein said transferring step may further comprises updating at least some of said registers to reflect the addition of said memory addresses to said log. The registers may reside in the processor unit or in the cache controller as previously explained.

In yet a further aspect of the present invention there is provided a computer program product comprising a computer-readable storage medium having computer-readable program code embodied therein, the computer readable program code being configured to operate a computer cluster comprising a first computer system including a memory comprising an image of a virtual machine, at least one processor unit, and a cache accessible to the at least one processor unit, wherein each processor unit is adapted to run the virtual machine in a first operation mode; wherein in said first operation mode, a processor unit of the first computer system performs the steps of: defining a log in the memory of the first computer system; running the virtual machine using said image; and upon transferring a modified cache line to the memory or another cache of the first computer system, writing only said memory address in the log; and wherein a processor unit updates a further image of the virtual machine in a different memory location by performing the steps of: reading the memory addresses from the log in the memory; retrieving the cache lines stored at said memory addresses; and updating the further image of the virtual machine with the retrieved cache lines.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
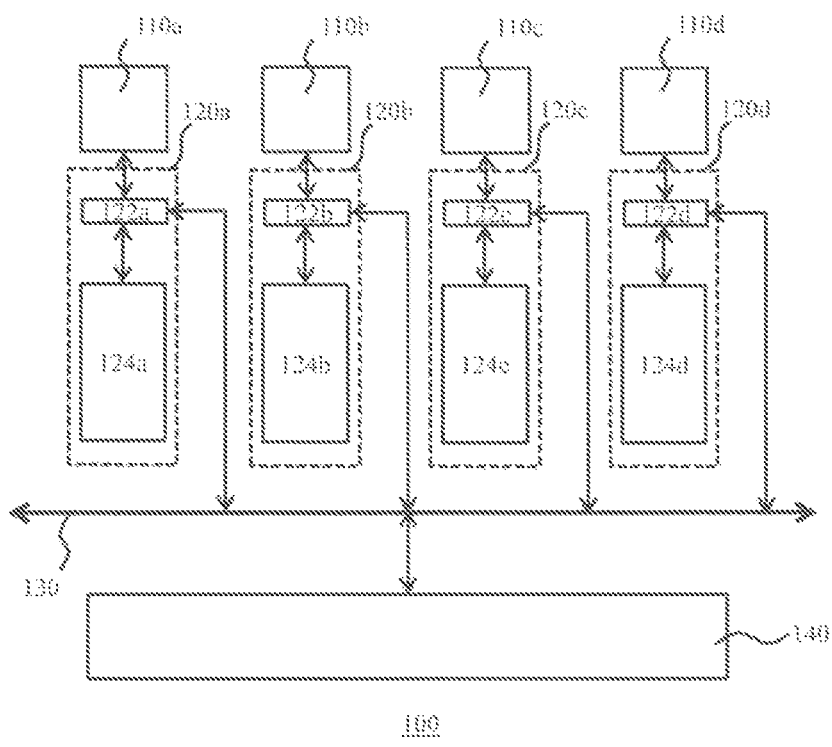
FIG. 1 schematically depicts a computer system according to an embodiment of the present invention.

It should be understood that the Figures are merely schematic and are not drawn to scale. It should also be understood that the same reference numerals are used throughout the Figures to indicate the same or similar parts.

FIG. 1 schematically depicts a computer system 100 according to an embodiment of the present invention. The computer system 100 comprises a plurality of processor units 110 for hosting a number of virtual machines. In FIG. 1, four processor units 110a-110d are shown by way of non-limiting example only; it should be understood that the computer system 100 may comprise any suitable number of processor units.

In the context of the present invention, a processor unit is intended to embody a unit of hardware that is capable of (pseudo-)autonomous execution of a computer program code, such as a processor, microprocessor or a core of a processor or microprocessor comprising a plurality of such cores.

Each processor unit 110 further has access to a cache 120, which typically includes a cache controller 122 in addition to a pool of entries 124, with each entry including a cache line and one or more tags. Any suitable cache architecture may be used, e.g. a single cache or several levels of cache, such as a level-1 cache, a level-2 cache and a level-3 cache or suitable subsets thereof. The cache 120 may reside in any suitable location. For instance, the cache 120 may be located on or in the vicinity of the processor unit 110 to ensure a significant reduction in data retrieval latency as is well-known per se.

In the embodiment shown in FIG. 1, each processor unit 110 has access to a dedicated cache 120, i.e. four cache 120a-d are shown by way of non-limiting example only, one for each of the processor units 110a-d. However, it should be understood that any suitable configuration may be chosen, e.g. a configuration in which a processor unit 110 has access to multiple caches 120, which may be organized in a hierarchical structure, e.g. a combination of a level-1, level-2 and level-3 cache, as previously explained.

Each processor unit 110 is typically communicatively coupled to bus architecture 130 through its cache 120, at least at a functional level. This means that any access of data by a processor unit 110 will involve its cache 120, as is commonly the case in such computer systems. The exact nature and connectivity of the bus architecture is not particularly relevant to the present invention, and it suffices to say that any suitable bus architecture 130 may be chosen.

The computer system 100 further comprises a memory 140 coupled to the bus architecture 130, which again may take any suitable form, e.g. a memory integrated in the computer system or a distributed memory accessible over a network. The memory may be volatile memory or a non-volatile memory, and may be a virtual memory, e.g. include data storage devices such as hard disks, which may be located in the computer system 100 or may be accessible via a network, e.g. a storage area network or network-attached storage. Many other suitable embodiments of such a memory 140 will be apparent to the skilled person.

Although not specifically shown, the computer system 100 may comprise additional components such as one or more network interfaces, input ports, output ports and so on, as is of course well-known to the skilled person.

In an embodiment, the computer system 100 is adapted to host a plurality of virtual machines on the processor units 110. In the context of the present invention, a virtual machine is a software representation of a computing device capable of hosting anything from a single computer program to a complete operating system, and which may be present itself as a separate system to the user of the computer system 100, such that the user has no awareness of the underlying computer system 100. For instance, in the case of the computer system 100 embodying a local area network (LAN) server having a plurality of processors each comprising a number of cores, the user accessing the LAN will be able to engage with the services hosted by the VMs but will be unaware of the underlying server. These concepts are of course well-known per se and will not be explained in further detail for the sake of brevity only.

One of the attractions of virtualization is improved robustness due to the ability to provide failover between VMs, as previously explained. To this end, a copy of a VM is periodically updated to ensure that the copy accurately represents the actual state of the original VM in case the original VM exhibits a failure and will have to fail over to the copy, as it is preferable that the one or more users of the VM are unaware of the failover. In the remainder, the original VM will also be referred to as the primary VM and its copy will also be referred to as the secondary VM.

Such synchronization between the primary VM and the secondary VM typically requires the temporary suspension of the primary VM to ensure that its state does not change during the synchronization. The duration of such suspension should be kept to a minimum to ensure that the one or more users of the VM are not noticeably affected by the temporary suspension.

To avoid such performance penalties, it is common practice to create differential checkpoints, in which only changes in the state of an entity are captured. Such checkpoints may be generated by writing the address and data from a cache line to a secondary memory such as a level-2 cache or the system memory 140 as soon as the data in a cache line is altered, as for instance is disclosed in U.S. Pat. No. 5,893,155 for the purpose of database roll-back. When using such checkpoint generation for VM replication purposes, it has the drawback that a large amount of data may be unnecessarily communicated during operation of the primary VM; for instance, if a cache line of the cache 120 used by the primary VM is updated multiple times during the operation mode of the primary VM, previous versions of the data in the cache line are unnecessarily written to the secondary memory as this 'old' data has become redundant.

The present invention has been based on the following realization. A cache controller 122 typically handles all changes in the state of a VM between two checkpoints for the following reasons. As all memory access requests from the processor unit 110 are handled by the cache controller 122, e.g. to check if the data at the memory address requested by the processor unit 110 is available in the cache 120, i.e. if there is a cache hit for such data. In the absence of such a cache hit, the cache controller 120 will expel a 'stale' cache line from the entries 124 through its cast-out engine to the appropriate address in the memory 140 and will retrieve the requested data from the memory address specified by the processor unit and store in the cache 120 in the location of the expelled cache line. In addition, each cache line typically comprises a tag indicating that the data retrieved from memory has been altered, i.e. is 'dirty', such that at some point the cast-out engine, e.g. during a cache flush, will write the dirty data back to memory.

A cache controller 122 may further comprise a snoop-intervention engine responsible for providing a further processor unit 110 exclusive access to a given cache line in case the further processor unit 110 wants to pre-fetch dirty data or modify clean data, which for instance can happen in case a VM is hosted by multiple processor units 110, e.g. multiple cores. Hence, all changes to the VM image in the memory 140 invoked by the processor unit 110 are handled by the cache controller 121, e.g. by the cast-out engine and/or the snoop-intervention engine.

This insight can be utilized by logging the memory addresses upon a cache line being removed from the cache 120, e.g. during a cache flush or when being replaced with data from another memory location in case of a cache miss. This log can be utilized to update a copy of the VM image by retrieving the altered data, i.e. the cast-out cache lines, from the logged memory addresses. There is no need to also log the data that is being cast out, as this data is always available in the VM image in memory 140. This does not facilitate rollback, as for rollback the data and a timestamp must be stored as well to allow restoration to a state at the timestamp, but is not a problem as for failover it is typically desirable to restore the failed VM to its actual state immediately prior to its failure or as close to this state as possible.

In an embodiment, the processor unit 110 hosting a primary VM typically includes a replication manager, which may be included in the design of a hypervisor, and/or which may be realized in hardware, in software, or a combination of hardware and software. According to an embodiment of the present invention, the replication manager is adapted to create a log in the system memory 140 for logging the memory addresses of the cast-out cache lines. Preferably, the data in the log is only accessible to the replication manager of a processor unit including other processor units 110 of the computer system 100 or processor units 110 of another computer system 100 as will be explained in more detail later.

Figure 2:
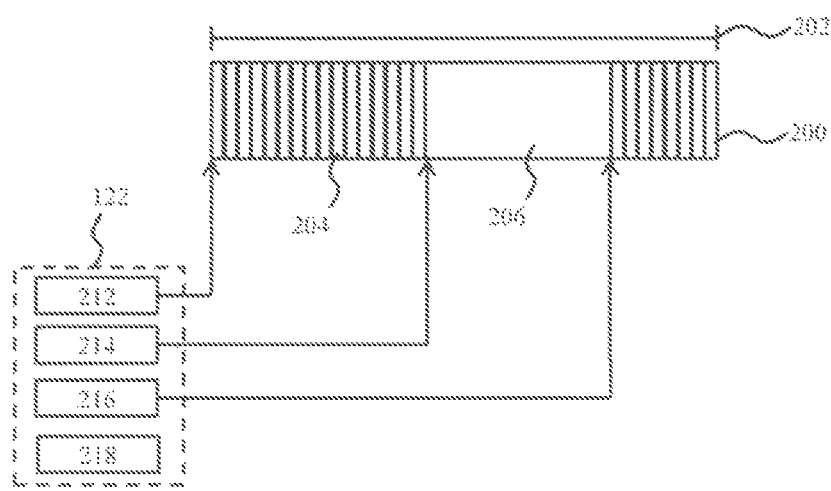
FIG. 2 schematically depicts an aspect of a computer system according to an embodiment of the present invention in more detail.

In an embodiment, the memory address log in the memory 140 has a defined size and allocation to avoid corruption of the memory 140. Any suitable implementation of such a log may be chosen. A particularly suitable implementation is shown in FIG. 2. In this embodiment, the log is defined as a circular buffer 200 in the system memory 140, and has a size 202 defined by the replication manager, e.g. the hypervisor of the processor unit 110. The log 200 is designed to comprise a plurality of cast-out memory addresses in memory locations 204. A portion 206 is shown to indicate unused memory locations in the log 200.

In order to facilitate the management of the log 200 during the execution of a VM on the processor unit 110, the computer system 100 includes a set of registers including a first register 212 in which the base address of the circular buffer 200 is stored, a second register 214 in which the next available address of the circular buffer is stored, a third register 216 in which the starting point of the circular buffer 200 is stored and a fourth register 218 in which the size 202 of the circular buffer 200 is stored. The set of registers are preferably located on the processor unit 110. Alternatively, the set of registers may form part of the cache controller 122.

During initialization of the log 200, the replication manager, e.g. the hypervisor, of the processor element 110 will populate the registers 212, 214, 216 and 218 with the appropriate values after which execution of the VM on the processor unit 110 may start or resume.

In accordance with an embodiment of the present invention, the hardware architecture of the cast-out engine of the cache controller 122 has been extended such that the cast-out engine not only casts out a cache line to the memory 140 but at the same time casts out the memory address of the cache line to the location in the log indicated by the pointer in register 214. In case the snoop-intervention engine is also capable of casting out cache lines to another cache of the computer system, the hardware architecture of the snoop-intervention engine of the cache controller 122 will be extended in the same manner.

During execution of the primary VM, the replication manager such as a hypervisor and the cache controller 122 are in charge of managing and updating the log in the system memory 140 as will be explained in more detail below.

Figure 3:
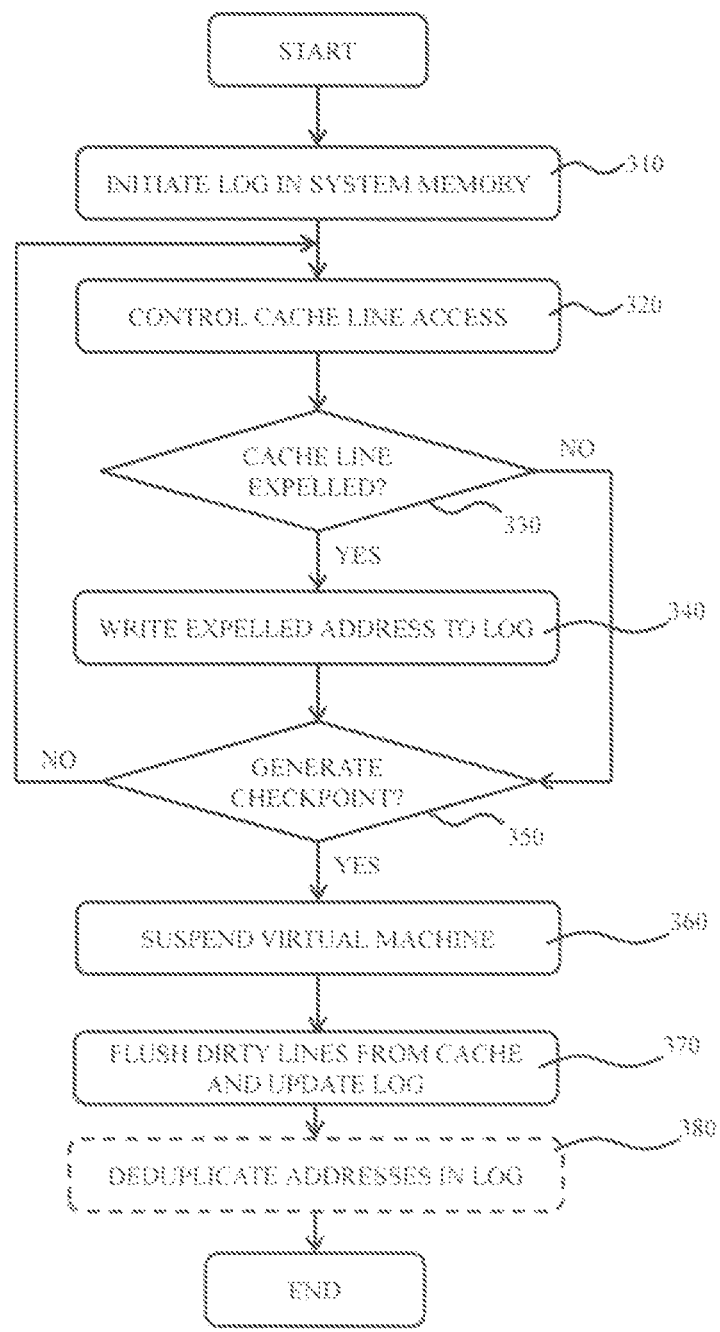
FIG. 3 schematically depicts a flow chart of an aspect of a method of updating computer system according to an embodiment of the present invention.

An example embodiment of such an updating method is shown in FIG. 3. After starting the method, the replication manager creates the log in the system memory 140 in step 310 and stores the relevant values of the base address, initial address (starting point), next available address and log size in the registers 212, 214, 216 and 218 as previously explained. The cache controller 122 subsequently controls in step 320 accesses to the cache lines in the line memory 124 of the cache 120 by the processor unit 110 (or any other processor unit) and checks if such an access has caused a modification of the cache line, in which case the cache controller will flag the cache line as being dirty, as is well-known per se.

The cache controller 122 further checks in step 330 if such a dirty cache line is to be expelled from the cache, e.g., checks if a cache miss has occurred. Upon a dirty cache line being expelled, the cast-out engine in step 340 will expel the dirty cache line by writing it to its original location, e.g. system memory 140 or another cache 120. In addition, the cast-out engine will write the memory address of the expelled cache line into the log 200. To this end, the cache controller 122 retrieves the pointer of the next available address in the log 200 from the register 214, e.g. fetches this pointer or requests this pointer from the replication manager of the processor unit 110.

At this point, the pointer in register 214 will need updating to ensure that no memory addresses are overwritten. The pointer is preferably updated by the cache controller 122 or alternatively by the replication manager, e.g. the hypervisor, of the processor unit 110, although the latter implementation may negatively impact on the performance of the hypervisor in case cache lines are frequently expelled, which is the case in most operating scenarios in which caches are utilized. In an embodiment, this updating step comprises moving the pointer forward by offsetting the pointer presently stored in the register 214 with the size of the stored memory address and writing this offset value in the register 214.

It is furthermore necessary to check if the next available address in the log 200 to be stored in register 214 should be wrapped around to the base address. In an embodiment, the cache controller 122 or the replication manager of the processor unit 110 will check if the next available address equals the base address+size of the log 200 as this indicates that the boundary of the address range of the log 200 in the system memory 140 has been reached, and will set, i.e. wrap around, the next available address to the base address if this is the case.

This process is repeated until a replication manager signals in step 350 that a checkpoint is to be created for the primary VM, i.e. that the primary VM is to be synchronized with the secondary VM. At this point, the replication manager suspends the primary VM in step 360 and forces the cast-out engine of the cache controller 122 to flush the dirty cache lines from the cache 120 in step 370. This will cause the cast-out engine to update the log 200 as previously explained, i.e. by writing the memory addresses of the dirty cache lines in the log 200 and update, or request the update of, the next available address register 214. After this flushing step, the log 200 contains the addresses of all cache lines that have been altered during the operation of the primary VM.

At this point, the replication manager may trigger the replication of the VM image in memory 140 to another memory location, e.g. another memory or cache by accessing the log 200, fetching the addresses stored in the log 200, fetching the cache lines stored at the fetched addresses and updating a copy of the VM image in the other memory location with the fetched cache lines, as previously explained.

It should be understood that the replication manager triggering the cache flush and subsequent update of the secondary image of the VM does not have to be the replication manager of the processor unit 110 running the VM. In an embodiment, the replication manager of another processor unit 110 of the computer system 100 may be in charge of this update process.

Generally, the embodiments in which the processor unit in charge of the VM image update process resides on the same computer system 100 as the processor unit 110 running the VM can be seen as embodiments in which the modified cache lines are pushed to another memory location. In an alternative embodiment, modified cache lines may be pulled from their primary memory location by a processor unit on a separate computer system, such as a processor unit responsible for hosting a secondary version of the VM, i.e. a processor unit to which the VM fails over, e.g. in case of a hardware failure of the processor unit hosting the primary VM. In this embodiment (as well as in the embodiment in a different processor unit of the computer system hosting the VM is in charge of the VM image replication process), the processor unit 110 hosting the VM forwards data relevant to the replication of its VM image in memory 140 including the values stored in the registers 212, 214, 216 and 218 to the replication manager of another processor unit, e.g. another processor unit in a different computer system 200 to allow this further replication manager to retrieve the altered cache lines using the addresses in the log 200 as will be explained in more detail later.

In an embodiment, the replication manager, e.g. hypervisor, is further adapted to check if the next available address in register 214 is equal to the initial address stored in register 216 prior to writing a cache line address to the log 200. If the pointers in registers 214 and 216 are the same, this signals that the log 200 is full and that no further addresses can be written to the log 200 as this would cause some of the addresses in the log 200 to be overwritten, thus causing incomplete replication of the primary or original VM image to its copy (the secondary VM image).

If a full log 200 is detected in this manner, the replication manager prevent such a replication error by initiating an immediate failover of the primary VM to a secondary VM hosted on another computer system or by initiating a complete resynchronization of all memory associated with the primary VM and the secondary VM. It will be understood such emergency measures are generally undesirable for performance reasons, such that it is important that the replication manager creates a log 200 that is large enough to store all cast-out memory addresses during the interval between the creating of two checkpoints.

After the flushing of the dirty cache lines from the cache in step 360, the method may further comprise the optional step 380 of deduplicating addresses in the log 200 to remove multiple instances of the same address in the log 200. This for instance can occur if data from a single memory address is expelled multiple times from the cache 120.

As will be understood by the skilled person, the checkpoint generation may further require synchronization of other relevant states between the primary and secondary VMs, e.g. the state of the CPU, I/O involving disk(s) and network and so on. As such synchronization is known per se, this has not been described in further detail for the sake of brevity only.

Figure 4:
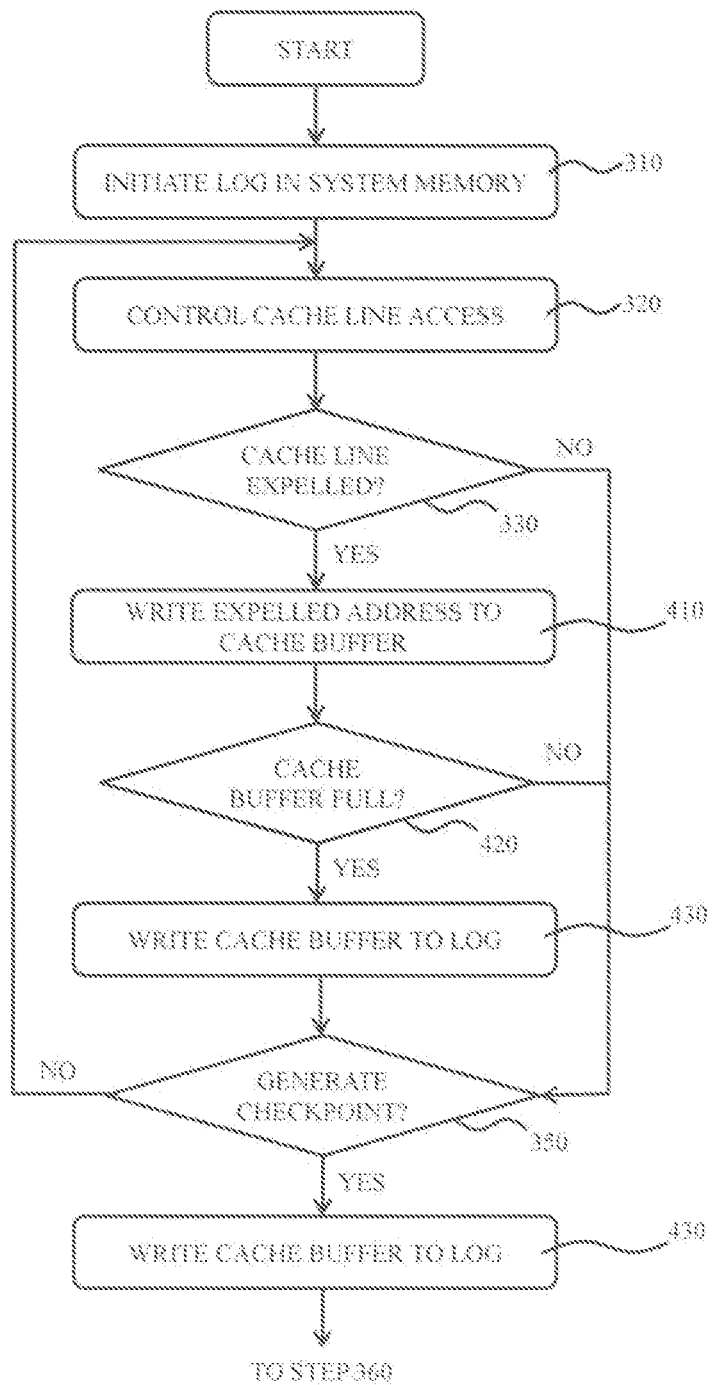
FIG. 4 schematically depicts a flow chart of an aspect of a method of updating computer system according to another embodiment of the present invention.

An alternative embodiment of a method for managing the log file 200 is shown in FIG. 4, which contains a number of the same steps of FIG. 3, which will not be explained again for the sake of brevity only. In this embodiment, a number of cache lines of the entries 124, e.g. two lines, of the cache 120 are used as an intermediate buffer to which memory addresses of the modified data can be written by the cast-out engine prior to writing them to the log 200. For instance, two cache lines of the entries 124 may be used as such an intermediate buffer, with each cache line typically able to contain a plurality of addresses, e.g. 16 addresses for a 16-bit address stored in a 256-bit cache line.

In step 410 the first line is being used to capture the memory addresses of the cache lines expelled from the cache 120 until full as checked in step 420, after which the first line is written to the log 200 in step 430 whilst at the same time the second line is used to capture cast-out memory addresses. Once the second line has filled, this line is written to the log 200 whilst the first line once again captures the memory addresses of the freshly cast-out cache lines. This is sometimes referred to as Ping-Pong buffering.

The above process is repeated until the replication manager, e.g. the hypervisor, signals the generation of a checkpoint in step 350, after which the remaining addresses in the intermediate cache buffer are written to the log 200 in a repeat of step 430 prior to proceeding to step 360 as shown in FIG. 3. It is noted that in this embodiment, the cache flush in step 370 may also use the intermediate buffer or may write the memory addresses of the flushed cache lines directly to the log 200. This embodiment has the advantage that the expulsion of cache lines from the cache 120 is no longer correlated to the relatively slow communication with the system memory 140, which improves the performance characteristics of the cache 120 and therefore of the primary VM.

At this point, it is noted that FIGS. 3 and 4 have been described assuming that a primary VM is hosted by a single processor unit 110. It is emphasized that this is by way of non-limiting example only. It is for instance equally feasible that a VM is hosted by several processor units 110, e.g. several microprocessor cores, in which case several logs 200 (one for each core) may be maintained that track different modifications to the VM image in memory 140. In such a scenario, the optional deduplication step 380 may for instance be performed over all logs 200 such that a memory address occurs only once in the combined logs 200 to reduce the amount of data that needs to be copied to the secondary VM during a differential checkpoint generation.

FIGS. 3 and 4 describe example embodiments of a first operating mode of a processor unit 110, which may be referred to as a producer mode in which the processor unit 110 products the relevant data required for the replication of the image of the VM in the memory 140 to a copy of this image e.g. in the memory of another computer system.

As previously mentioned, a processor unit 110 can also operate in a second operating mode, in which it does not host a VM but is instead responsible for replicating the image of a primary VM. This second operating mode may be referred to as a consumer mode, as a processor unit 110 in this mode is adapted to consume the modified cache lines in the VM image produced by a processor unit 110 executing the VM in its first operation mode or producer mode. For instance, a further processor unit 110 of the computer system 100 including the processor unit 110 hosting the VM may be responsible for updating a replica of the VM image in a further location, e.g. a memory of another computer system. Alternatively, the processor unit 110 hosting the VM may switch between operating modes to assume responsibility for updating this replica. In yet another embodiment, a processor unit of another computer system, e.g. the computer system on which the replica is stored, is responsible for updating this replica of the VM image.

The update of the VM image replica ensures that a processor unit 110 of a computer system 100 storing the replica in its memory can take over execution of the VM upon a hardware failure in the computer system 100 hosting the primary VM.

In an alternative embodiment, the second operating mode is not a separate operating mode but forms part of the first operating mode, in which case the processor unit 110 responsible for the execution of the primary VM also is responsible for updating the replica of the VM in the further memory location.

It should be understood that in a computer cluster comprising multiple computer systems 100, some processor units 110 may be in producer mode (i.e. VM hosting mode) whilst other processor units 110 are in consumer mode (i.e. in VM image replication mode). Even a single computer system in such a cluster may comprise processor units 110 in producer mode as well as in consumer mode, as previously explained. In an embodiment, the replication manager, e.g. the hypervisor, may control whether a processor unit 110 is in producer mode or consumer mode, e.g. by setting a hardware flag for the processor unit 110 such that it can be recognized in which mode a processor unit 110 is operating.

Figure 5:
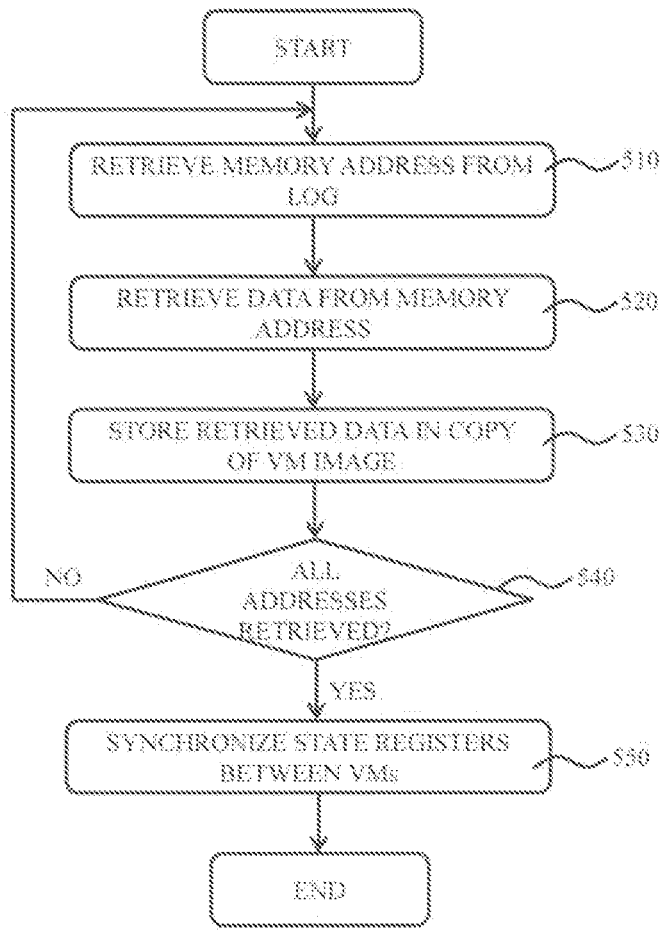
FIG. 5 schematically depicts a flow chart of another aspect of a method of updating computer system according to an embodiment of the present invention.

FIG. 5 depicts a flow chart of the method steps performed during such a second operating mode of a processor unit 110. In the consumer mode, a processor unit 110, e.g. the replication manager of the processor unit 110, receives the relevant information from the replication manager of the processor unit 110 in producer mode, such as the contents of the registers 212, 214, 216 and 218 that will allow the replication manager of the consumer processor unit 110 to access the memory 140 of the computer system 100 including the producer processor unit 110. The replication manager of the producer processor unit 110 may volunteer the relevant information or may provide the relevant information upon request thereto by the replication manager of the consumer processor unit 110. Obviously, in an embodiment where the processor unit 110 hosting the VM also acts as the processor unit responsible for updating the secondary VM image, the above step may be omitted.

Upon retrieving the relevant information, the consumer processor unit 110 retrieves the memory addresses stored in the log 200 created by the replication manager of the producer processor unit 110 hosting the primary VM in step 510, retrieves the data stored at the retrieved memory address from the memory 140 of the computer system 100 including the producer processor unit 110 in step 520 and updates the copy of the VM image accordingly. This process is repeated until all addresses have been retrieved from the log 200 as checked in step 540, after which other state registers, if any, e.g. state registers of the CPU as previously explained, may be replicated as shown in step 550.

At this point, the consumer processor unit 110 may signal the producer processor unit 110 hosting the primary VM that replication is complete, upon which the producer processor unit 110 hosting the primary VM, e.g. its hypervisor, will terminate the suspension of the primary VM and reinitialize the log 200, e.g. reset one or more of the registers 212, 214 and 216 in the cache management module 122.

It should be immediately apparent to the skilled person that various modifications may be possible to the method shown in FIG. 5 without departing from the teachings of the present invention. For instance, the consumer processor unit 110 may have permission to perform the deduplication of the addresses in the log 200 of the producer processor unit 110 hosting the primary VM prior to retrieving the memory addresses from the log 200 in step 510, in which case step 380 may be omitted from the producer method shown e.g. in FIG. 3.

In a particularly advantageous embodiment, a processor unit 110 in the second operating mode, i.e. consumer mode, is adapted to speculatively process the log 200 of a processor unit 110 in the first operating mode, i.e. producer mode. This has the advantage that the duration of the suspension of the primary VM can be further reduced as part of the log 200 will already have been processed by the consumer processor unit 110 when the producer processor unit 110 suspends the VM in step 360.

Figure 6:
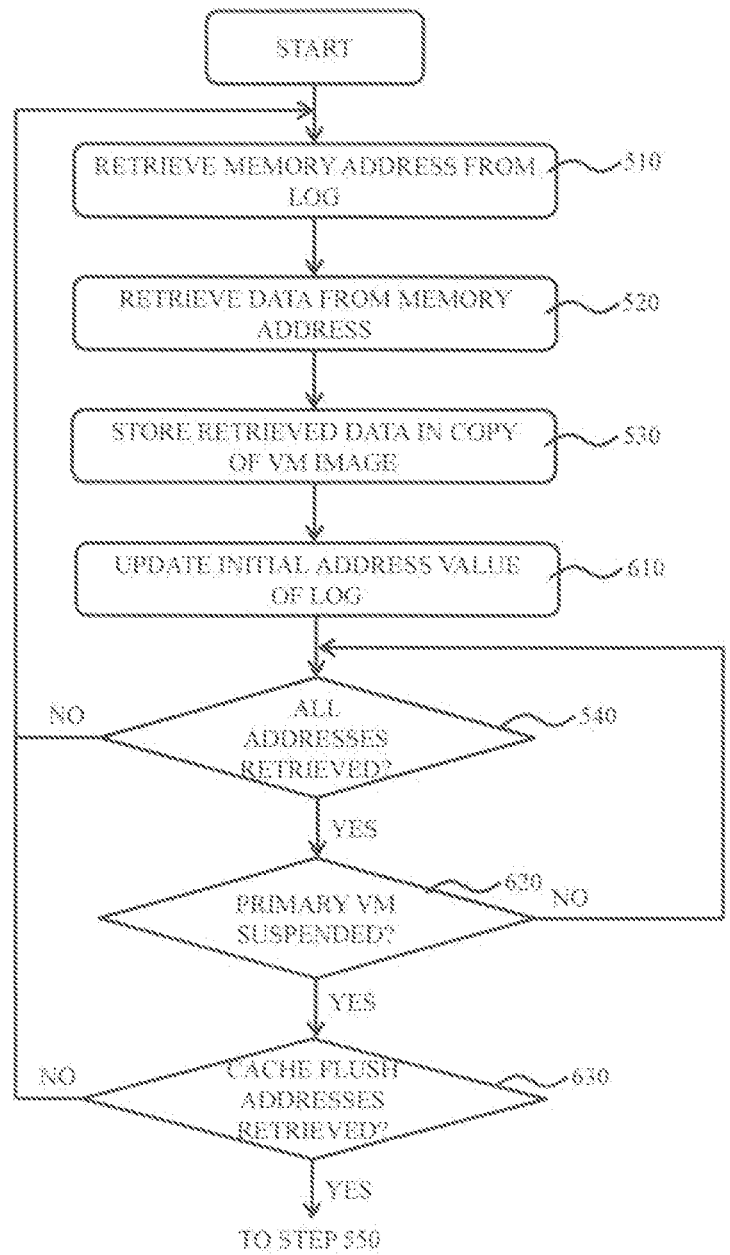
FIG. 6 schematically depicts a flow chart of another aspect of a method of updating computer system according to another embodiment of the present invention.

An example flowchart of this embodiment is shown in FIG. 6. In FIG. 6, several steps are identical to the method of FIG. 5, and these steps will therefore not be explained again for the sake of brevity. In steps 510, 520 and 530 of FIG. 6, the consumer processor unit 110 retrieves a memory address from the log 200 of the processor unit 110 hosting the primary VM, retrieves the data from the memory 140 in the computer system 100 of the producer processor unit 110 and updates the copy of the VM image accordingly as previously explained.

In additional step 610, the consumer processor unit 110 invokes the update of the initial address value of the log 200 as stored in register 216 associated with the producer processor unit 110 hosting the primary VM. This may be achieved in any suitable way, e.g. by providing the replication manager of the consumer processor unit 110 with write privileges to update this register or by the consumer processor unit 110 instructing the replication manager, e.g. hypervisor of the producer processor element 110 to update this register value accordingly.

Step 610 ensures that the available space in the log 200 of the processor unit 110 hosting the primary VM is kept up to date, as the addresses already retrieved by the consumer processor unit 110 may be overwritten, as indicated by the change in the initial address stored in the register 216 associated with the producer processor unit 110 hosting the primary VM to the first address in the log 200 not yet processed by the consumer processor unit 110. This therefore reduces the risk of the log 200 becoming full prematurely as the capacity of the log 200 is effectively increased by the speculative processing of the log 200 by the consumer processor unit 110. When the primary VM becomes suspended, as checked in step 620 and all addresses have been retrieved from the log 200, the method may proceed to step 550 as previously explained in the detailed description of FIG. 5.

In an alternative embodiment (not shown), as soon as the primary VM becomes suspended, step 610 may be omitted from FIG. 6 as it is no longer necessary to update the initial address value of the log 200 as stored in register 216 associated with the producer processor unit 110 hosting the primary VM, as no further addresses will be written to the log 200 and the log 200 will be re-initialized prior to the reactivation of the primary VM.

Figure 7:
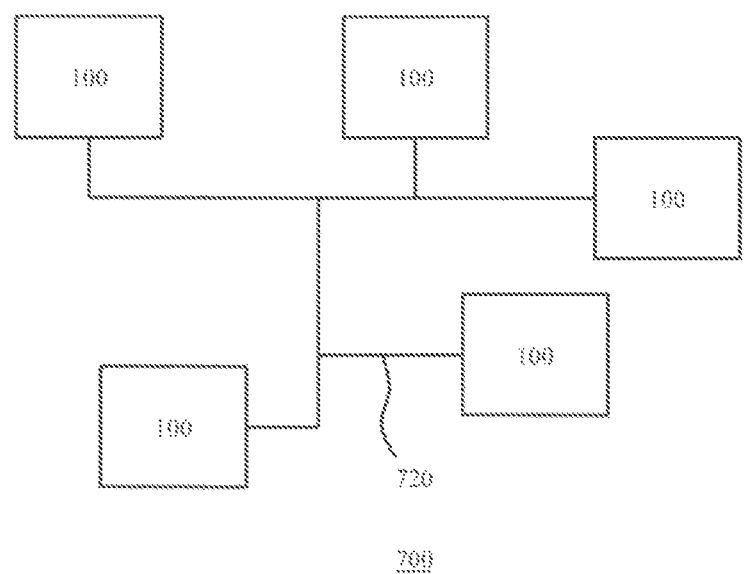
FIG. 7 schematically depicts a computer cluster according to an embodiment of the present invention.

FIG. 7 schematically depicts a computer cluster 700 according to an example embodiment of the present invention. The computer cluster 700 comprises a plurality of computer systems 100 according to one or more embodiments of the present invention, which are communicatively coupled to each other via a network 720. The network 720 may be any suitable data communication network, e.g. a wired or wireless local area network, a wireless or wired wide area network, the Internet and so on. The computer cluster 700 is typically adapted to host a plurality of virtual machines on the processor units 110 of the various computer systems 100 to be utilized by the users of the computer cluster 700. The computer cluster 700 benefits from the VM replication principles of the present invention in that multiple up-to-date or mirror images of a VM may be generated in the respective memories 140 of at least some of the various computer systems 100 such that rapid VM failover can be provided with little overhead.

It should be understood that in the context of the present invention, a computer system is to be interpreted as a device that includes a collection of processor elements that can be utilized in unison. This does not necessarily equate to a single physical entity; it is equally feasible that a computer system is distributed over several physical entities, e.g. different boxes, or that a single physical entity includes more than one computer systems, e.g. several separate groups of processor units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the use's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
    a processor unit adapted to run a virtual machine in a first operating mode;
    a cache accessible to the processor unit, said cache including a cache controller; and
    a memory accessible to the cache controller that stores an image of said virtual machine;
    wherein:
        the processor unit is adapted to provide a replication manager adapted to define a log in the memory prior to running the virtual machine in said first operating mode;
        the cache controller is adapted, while the virtual machine is running in the first operating mode, to:

transfer a modified cache line from the cache to the memory or another cache; and in response to transfer of the modified cache line, write only the memory address of the transferred modified cache line in the defined log; and the processor unit is further adapted to update a further image of the virtual machine in a different memory location by:

retrieving the memory addresses from the log;

retrieving the modified cache lines utilizing the memory addresses in the log; and updating the further image utilizing the modified cache lines.

2. The computer system of claim 1, wherein the cache controller is further adapted to write the memory address of the transferred modified cache line to a further cache line and to periodically write a plurality of memory addresses of the transferred modified cache lines from the further cache line to the log.

3. The computer system of claim 1, wherein:

the log is a circular buffer;

the system comprises a plurality of registers adapted to store:

a first pointer to a wrap-around address of the circular buffer;

a second pointer to the next available address of the circular buffer;

a third pointer to an initial address of the circular buffer; and the size of the circular buffer; and the cache controller is adapted to trigger the update of at least the second pointer following the writing of a memory address in the log.

4. The computer system of claim 1, wherein each processor unit is configured to deduplicate the memory addresses in the log prior to the retrieval of the memory addresses from the log.

5. The computer system of claim 1, wherein the cache controller includes a cast-out engine adapted to transfer a modified cache line from the cache to the memory or another cache and to write only the memory address of the transferred modified cache line in the defined log.

6. A computer cluster comprising a plurality of computer systems according to claim 1 and a network interconnecting the plurality of computer systems.

7. The computer system of claim 1, wherein the processor unit is adapted to update said further image in a second operating mode.

8. The computer system of claim 7, wherein the replication manager is adapted to update said further image in a second operating mode.

9. The computer system of claim 7, wherein the replication manager is adapted to switch the processor unit between the first operating mode and the second operating mode.

* * * * *